(12) United States Patent
Gu et al.

(10) Patent No.: US 6,658,618 B1
(45) Date of Patent: Dec. 2, 2003

(54) ERROR RECOVERY METHOD FOR VIDEO COMPRESSION CODING USING MULTIPLE REFERENCE BUFFERS AND A MESSAGE CHANNEL

(75) Inventors: Qunshan Gu, Londonderry, NH (US); Timothy Root, Nashua, NH (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 09/389,170

(22) Filed: Sep. 2, 1999

(51) Int. Cl.[7] .......................... G06F 11/00; G06F 11/30
(52) U.S. Cl. ........................ 714/746; 714/710
(58) Field of Search ................ 714/746, 710; 369/53.17, 53.1

(56) References Cited

U.S. PATENT DOCUMENTS

| | | | | |
|---|---|---|---|---|
| 5,155,594 A | | 10/1992 | Bernstein et al. | 358/136 |
| 5,278,793 A | * | 1/1994 | Yeh | 365/200 |
| 5,497,404 A | * | 3/1996 | Grover et al. | 375/357 |
| 5,508,636 A | * | 4/1996 | Mange et al. | 326/38 |
| 5,588,046 A | * | 12/1996 | Knuth et al. | 379/67 |
| 5,912,676 A | * | 6/1999 | Malladi et al. | 345/521 |
| 6,357,028 B1 | * | 3/2002 | Zhu | 714/751 |

OTHER PUBLICATIONS

International Telecommunication Union, "Series H: Audio-visual and Multimedia Systems", (2–98), 8 pages.
Cote et al., "H.263+: Video Coding at Low Bit Rates", vol. 8, No. 7, (Nov., 1998), pp. 849–866.

* cited by examiner

*Primary Examiner*—Phung M. Chung
(74) *Attorney, Agent, or Firm*—Wong, Cabello, Lutsch, Rutherford & Brucculeri, L.L.P.

(57) ABSTRACT

Transmitting and receiving video data includes an encoder storing macroblocks in a plurality of reference buffers, the encoder transmitting macroblocks encoded relative to each of the reference buffers, a decoder receiving the macroblocks, and, in response to the decoder indicating an error with respect to a particular macroblock corresponding to a first one of the buffers, the encoder using a second one of the buffers for error recovery if there is no error associated with the second buffer. In response to the decoder indicating an error with respect to a particular macroblock and all of the buffers having errors associated therewith, the encoder may transmit at least one macroblock that is encoded independent of any other macroblocks.

39 Claims, 11 Drawing Sheets

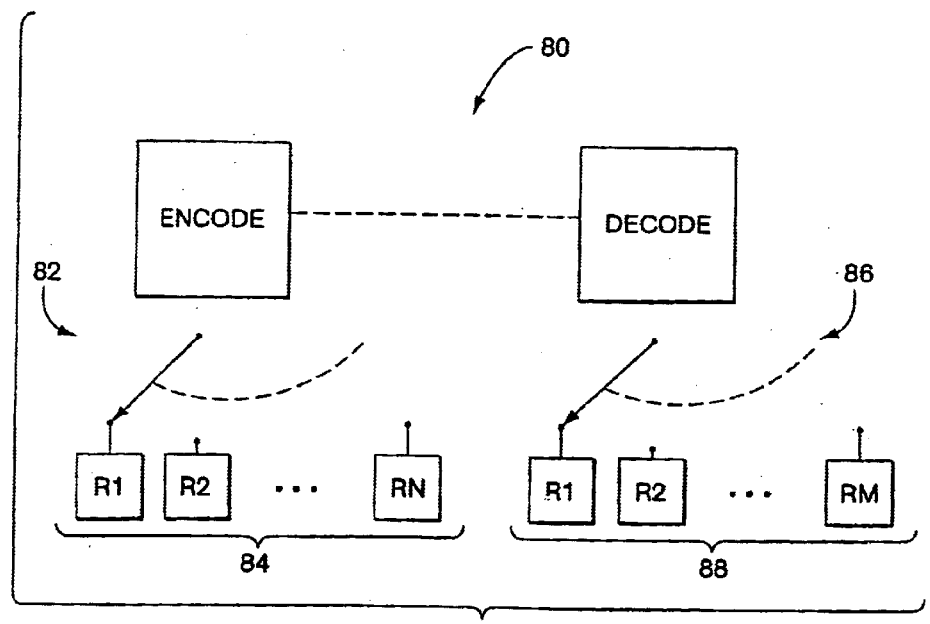
Fig. 5
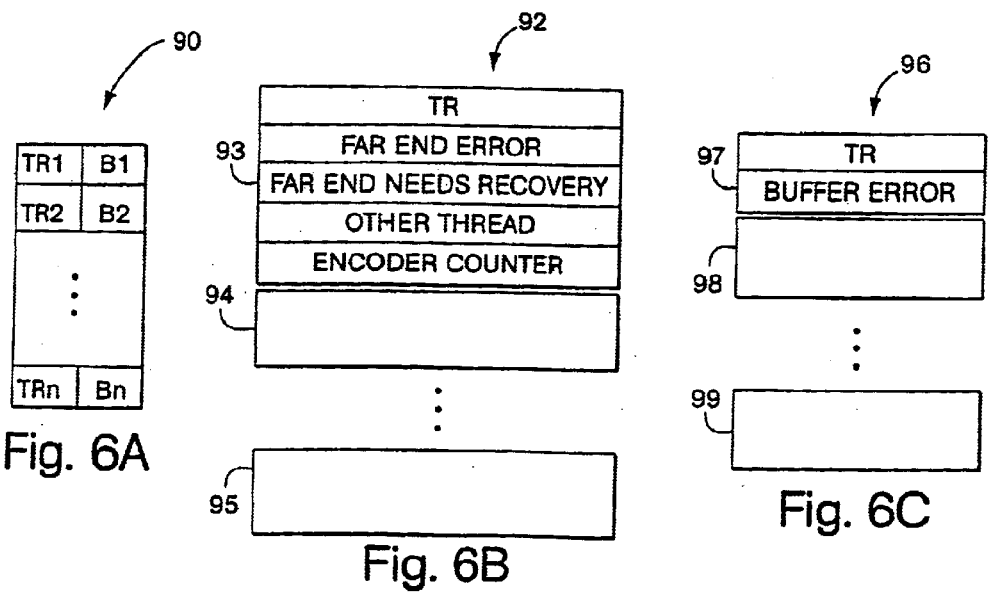
Fig. 6A
Fig. 6B
Fig. 6C

ERROR RECOVERY METHOD FOR VIDEO COMPRESSION CODING USING MULTIPLE REFERENCE BUFFERS AND A MESSAGE CHANNEL

BACKGROUND OF THE INVENTION

1. Field of the Invention

This application relates to the field of digital data coding and compression and more particularly to the field of coding digital data for video conferencing in a manner that reduces the amount of data provided in response to errors in received data.

2. Description of Related Art

A video signal includes data representing a temporal succession of still images which are referred to as "frames". If the time between each frame is small enough and the frames are displayed in temporal sequence, the video signal simulate motion. For example, the NTSC television standard provides for transmitting a video signal with thirty frames per second. On a conventional U.S. television set which receives NTSC video signals, the display is thus updated thirty times per second to provide a simulated moving image.

Transmitting video signals over data channels having relatively low band width provides challenges. Generally, there exists a tradeoff between the number of frames per second which may be provided and the resolution of each frame. Increasing the resolution of each frame increases the amount of data corresponding to each frame. Thus, for relatively high resolution frames, the number of frames per second which may be transmitted in a low band width channel is smaller than the number of frames which may be transmitted per second in connection with low resolution frames.

One solution for improving the performance of video signals transmitted over relatively low bandwidth channels is to eliminate the need to transmit each frame completely. Instead, what is transmitted is other information that allows reconstruction of each frame at the receiving end. For example, the H.263 ITU standard provides for transmitting a first frame in its entirety and then transmitting one or more motion vectors and prediction error information for subsequent frames. The motion vector(s) represent translation of portion(s) of the image from a reference frame to a current frame while the prediction error information represents the difference between the current frame and the reference frame with the motion vector information applied thereto. Thus, each video frame may be determined by applying the motion compensation vector to the reference frame and then applying the prediction error information. The video signal can then be transmitted by sending the first frame followed by motion vectors and prediction error information for each of the subsequent frames.

The H.263 standard also allows for relative coding of a portion of a frame, which is called a "macroblock." In the case of using a macroblock, the vector and error information may be provided relative to the macroblock, as opposed to an entire frame. In addition, instead of transmitting an entire new reference frame, it may only be necessary to transmit a new macroblock, which may then be used for subsequent relative encoding with motion vector(s), error compensation, etc.

A drawback to the H.263 technique for encoding video information is that, since each macroblock is based on the motion vectors and prediction error information applied to the previous macroblock, then a transmission error or data loss causes all subsequent macroblocks to be suspect. Recovery from such an error may be performed by the transmitter resending a new macroblock. For transmission channels with a relatively low error rate, this does not pose a significant problem. An enhanced version of the H.263 standard, deemed H.263+ or H.263 version 2, provides a mechanism to indicate to the transmitter that the received signal contains errors. However, the H.263+ standard has limitations, some of which are described in annex N.5 of the H.263+ standard specification.

Thus, when the receiver receives motion vector information and prediction error information that is incorrect, the receiver sends a signal back to the transmitter to request that an entire reference frame be sent so that error recovery is possible.

SUMMARY OF THE INVENTION

According to the present invention, transmitting and receiving video data includes an encoder storing macroblocks in a plurality of reference buffers, the encoder transmitting macroblocks that are encoded relative to each of the reference buffers, a decoder receiving the macroblocks, and in response to the decoder indicating an error with respect to a particular one of the macroblocks encoded relative to a first one of the buffers, the encoder using a second one of the buffers for error recovery if there is no error associated with the second buffer. In response to the decoder indicating an error with respect to a particular one of the macroblocks and all of the buffers having errors associated therewith, the encoder may transmit at least one macroblock that is encoded independent of any other macroblocks. The decoder may receive a macroblock having an error associated therewith and, in response to all buffers of the decoder having errors associated therewith, the decoder may transmit a request to the encoder to transmit at least one macroblock that is encoded independent of any other macroblocks. In response to the request, the encoder may transmit at least one macroblock that is encoded independent of any other macroblocks.

The encoder using a second one of the buffers for error recovery may include coding a macroblock using a second one of the buffers as a reference and marking the first one of the buffers as having an error. In response to marking the first one of the buffers as having an error, a timer may be set to indicate an amount of time since the error occurred and, in response to the amount of time since the error occurred being greater than a predetermined threshold, the error associated with the first one of the buffers may be cleared. The predetermined threshold may correspond to a round trip transmission and processing time between the encoder and the decoder.

A number of buffers used may be increased in response to errors requiring the encoder to transmit at least one macroblock that is encoded independent of any other macroblocks and decreased if, after a predetermined amount of time, no errors requiring the encoder to transmit at least one macroblock that is encoded independent of any other macroblocks occur. Each macroblock may be associated with a temporal reference and a table may be provided that maps each temporal reference number with one of: a particular one of the buffers and a value indicating that a macroblock corresponding to a temporal reference number is not being stored.

According further to the present invention, transmitting video data includes an encoder storing macroblocks in a plurality of reference buffers, the encoder transmitting macroblocks that are encoded relative to each of the reference buffers, and, in response to an error with respect to a macroblock corresponding to a first one of the buffers, the encoder using a second one of the buffers for error recovery if there is no error associated with the second buffer. In response to an error with respect to a macroblock and all of the buffers having errors associated therewith, the encoder may transmit at least one macroblock that is encoded independent of any other macroblocks. In response to a receiving a request, the encoder may transmit at least one macroblock that is encoded independent of any other macroblocks. The encoder using a second one of the buffers for error recovery may includes coding a macroblock using a second one of the buffers as a reference and marking the first one of the buffers as having an error. In response to marking the first one of the buffers as having an error, a timer may be set to indicate an amount of time since the error occurred and, in response to the amount of time since the error occurred being greater than a predetermined threshold, the error associated with the first one of the buffers may be cleared. The predetermined threshold may correspond to a round trip transmission and processing time between the encoder and the decoder. number of buffers used may be increased in response to errors requiring the encoder to transmit at least one macroblock that is encoded independent of any other macroblocks and may be decreased if, after a predetermined amount of time, no errors requiring the encoder to transmit at least one macroblock that is encoded independent of any other macroblocks occur. Each macroblock may be associated with a temporal reference number and a table may be provided that maps each temporal reference number with a particular one of the buffers or a value indicating that a macroblock corresponding to a temporal reference number is not being stored.

According further to the present invention, receiving video data includes a decoder receiving a plurality of macroblocks that are coded relative to a plurality of buffers corresponding to a plurality of macroblocks and, in response to an error with respect to a particular macroblock, the decoder marking for error a first one of the buffers associated with the particular macroblock. Following marking for error a first one of the buffers, the decoder may receive a macroblock coded relative to a second one of the buffers. Following marking for error the first buffer, and in response to all buffers of the decoder having errors associated therewith, the decoder may request at least one macroblock that is encoded independent of any other macroblocks. Following requesting at least one macroblock that is encoded independent of any other macroblocks, the decoder may reset a timer and may forgo requesting an other macroblock that is encoded independent of any other macroblocks until the timer has exceeded a predetermined threshold.

according further to the present invention, an apparatus that transmits video data includes a plurality of reference buffers that store a plurality of macroblocks, a reference processor unit, coupled to the buffers, that provides at least one motion compensation vector and a motion compensated image of a macroblock provided thereto, a difference unit, coupled to an input video signal and to an output of the reference processor unit to provide a difference therebetween, and a coding controller that controls transmission of video data to provide each macroblock as either a macroblock that is encoded independent of any other macroblocks or a macroblock coded relative to an output provided by said difference unit where, in response to an error for a macroblock corresponding to a first one of the buffers, the controller causes the reference processor unit to use a second one of the buffers for error recovery if there is no error associated with the second buffer. In response to all of the buffers having errors associated therewith, the controller may cause transmission of at least one macroblock that is encoded independent of any other macroblocks. In response to receiving a request, the controller may cause transmission of at least one macroblock that is encoded independent of any other macroblocks. A number of buffers used may be increased in response to errors and may be decreased in response to not receiving errors after a predetermined amount of time.

According further to the present invention, a computer storage medium containing a computer program includes means for storing macroblocks in a plurality of reference buffers, means for transmitting macroblocks that are encoded relative to each of the reference buffers, and means for using a second one of the buffers for error recovery if there is no error associated with the second buffer in response to an error with respect to a particular macroblock corresponding to a first one of the buffers. The computer storage medium may also include means for transmitting at least one macroblock that is encoded independent of any other macroblocks in response to an error with respect to a particular macroblock and all of the buffers having errors associated therewith. The computer storage medium may also include means for detecting a request for at least one macroblock that is encoded independent of any other macroblocks.

Means for using a second one of the buffers for error recovery may include means for coding a macroblock using a second one of the buffers as a reference and means for marking the first one of the buffers as having an error. The computer storage medium may also include means for setting a timer to indicate an amount of time since the error occurred in response to marking the first one of the buffers as having an error and means for clearing the error associated with the first one of the buffers in response to the amount of time since the error occurred being greater than a predetermined threshold. The predetermined threshold may correspond to a round trip transmission and processing time.

According further to the present invention, a computer storage medium containing a program for receiving video data includes means for receiving a plurality of macroblocks that are coded relative to a plurality of buffers corresponding to a plurality of macroblocks and means for requesting a particular macroblock be resent and marking for error a first one of the buffers associated with the particular macroblock in response to an error with respect to the particular macroblock. The computer storage medium may also include means for receiving the macroblock coded relative to a second one of the buffers following requesting the particular macroblock.

According further to the present invention, transmitting video data includes an encoder storing macroblocks in a plurality of reference buffers where each macroblock is associated with a temporal reference number, providing a table that maps each temporal reference number with a particular one of the buffers, wherein for a subset of the temporal reference numbers, a value indicates that none of the buffers correspond thereto, the encoder transmitting macroblocks that are encoded relative to each of the reference buffers, and in response to receiving an error message indicating an error with respect to a particular one of the macroblocks encoded relative to a first one of the buffers, the encoder using the table and a second one of the buffers for error recovery if there is no error associated with the second buffer. For each buffer, a data structure may be provided containing values for a corresponding one of the temporal reference numbers, an indication that an error has occurred, an indication that an error requires recovery, an indication that the buffer has been used for recovery of another thread, and a timer indicating an amount of time since recovery of the buffer was undertaken. In response to receiving an error message indicating an error with respect to a particular one of the macroblocks encoded relative to a first one of the buffers, values for the first buffer indicating that an error has occurred and that an error requires recovery may be set to TRUE and the timer indicating an amount of time since recovery of the buffer was undertaken may be set to zero. After using the table and a second one of the buffers for error recovery, the value indicating that an error requires recovery may be set to FALSE. After setting the value indicating that an error requires recovery to FALSE, the timer may be incremented according to wall clock time. In response to the timer being greater than a predetermined value, the value indicating that an has occurred may be set to FALSE The system described herein provides a mechanism for using multiple reference buffers in a manner that reduces the tendency to transmit entire frames in instances where the transmission channel has a relatively high bit error ratio. In addition, the system also reduces the amount of time a received video signal may be frozen waiting for error recovery in the form of an entire frame.

BRIEF DESCRIPTION OF THE DRAWINGS

FIG. 5 illustrates a multi-buffer encoding and decoding system according to the present invention.

FIG. 6A illustrates a table structure used by the system to index buffers according to the present invention.

FIG. 6B illustrates a data structure used by the encoder according to the present invention.

FIG. 6C illustrates a data structure used by a decoder according to the present invention.

DETAILED DESCRIPTION OF THE PREFERRED EMBODIMENT(S)

Figure 1:
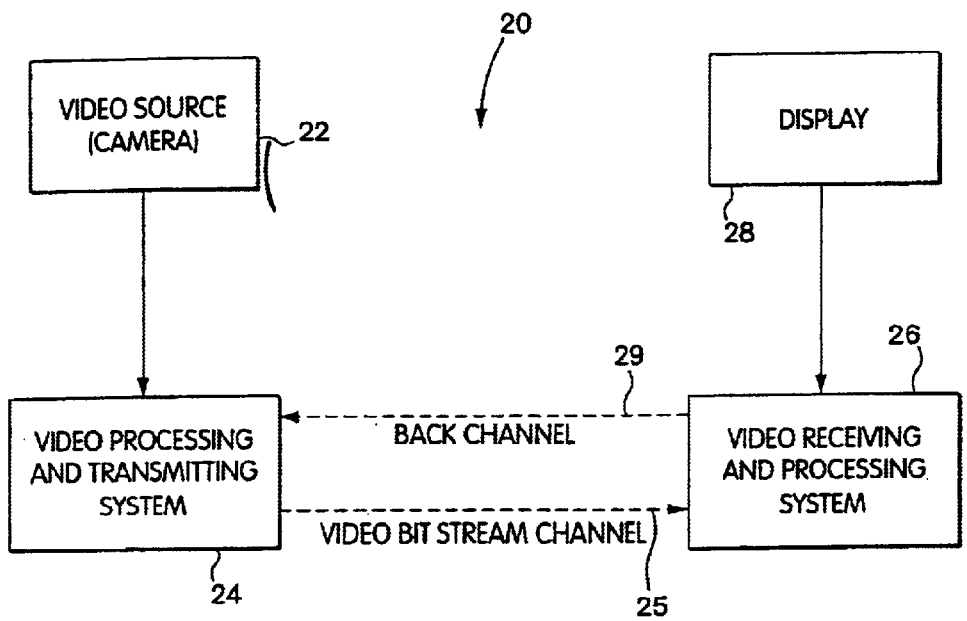
FIG. 1 illustrates a video system according to the present invention.

Referring to FIG. 1, a video system 20 includes a camera 22 that provides a video signal containing an image to a video processing and transmission system 24. The video processing and transmission system 24 provides a video bit stream signal on a video data channel 25. The video bit stream signal is indicative of frames and portions thereof provided by the camera 22. The video bit stream signal is received by a video receiving and processing system 26 that is also coupled to the video data channel 25.

The video receiving and processing system 26 processes the video bit stream signal to provide a video signal for a display 28. The display 28 may be implemented using a conventional video monitor or equivalent. The signal provided by the video receiving and processing system 26 to the display 28 may be any one of a variety of video signal types, such as RGB or YUV, depending upon the type of input video signal recognized by the display 28.

FIG. 1 also shows a back channel 29 that is used to provide a back channel signal from the video receiving and processing system 26 to the video processing and transmitting system 24. As set forth in the H.263+ standard, the back channel 29 may be the same logical channel as the video bit stream (deemed the "video mux mode" in H.263+, annex N). Alternatively, in a preferred embodiment, the back channel 29 is a separate logical channel from the logical channel used for the video data channel 25. Note that the video data channel 25 and the back channel 29 may be implemented using any one of a variety of transmission media, such as a conventional ISDN line, the Internet, a dedicated hard-wired connection, or any other appropriate data transmission system.

Figure 2:
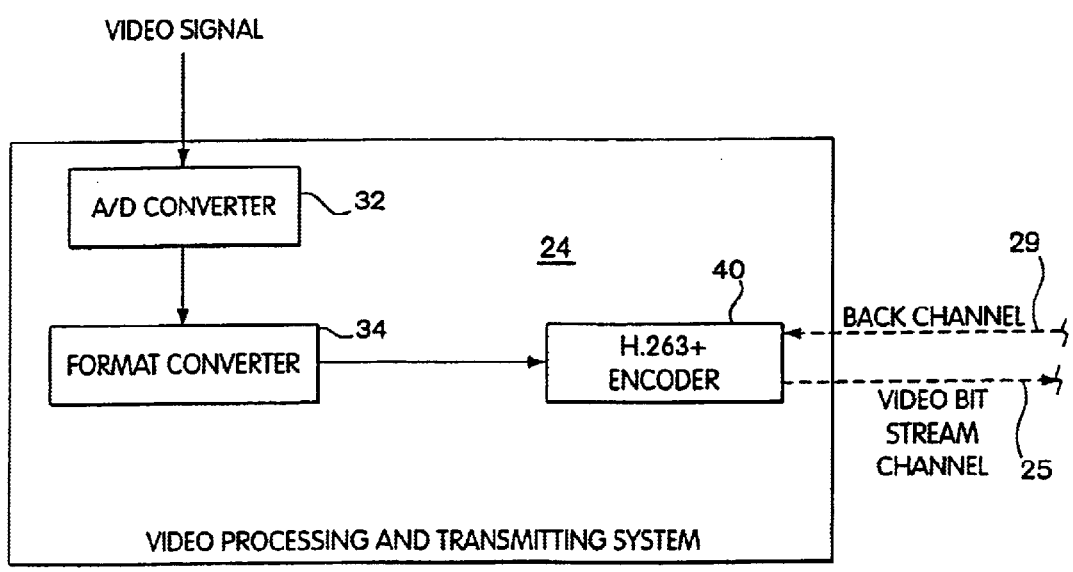
FIG. 2 illustrates a video processing and transmitting system according to the present invention.

Referring to FIG. 2, the video processing and transmitting system 24 is shown as including an A/D converter 32, a format converter 34, and a H.263+ encoder 40. The A/D converter 32 converts an analog video input signal from the camera 22 into a digital signal. In other embodiments, the camera 22 may output a digital signal (e.g., capture VGA), in which case the A/D converter 32 may not be necessary.

The output of the A/D converter 32 is provided to a format converter 34 which converts the video format from the camera 22 into a format that is convenient for processing by the H.263+ encoder 40. Convenient formats include sub-QCIF, QCIF, CIF, 4CIF, and 16CIF. Alternatively, if the camera 22 already outputs a video signal in one of the above-listed formats, then the format converter 34 may not be necessary. Alternatively still, the H.263+ encoder 40 may include a format conversion capability, or may be adapted to accept a format other than one of the above-listed formats, such as native NTSC, VGA, etc. Note also that the format converter 34 may convert one video format into another video format in a conventional manner and thus is not described in more detail herein.

The output of the format converter 34 is coupled to the input of the H.263+ encoder 40, which provides the video bitstream signal on the video data channel 25 and which receives the back channel signal on the back channel 29. Operation of the H.263+ encoder 40 is described in more detail hereinafter.

In a preferred embodiment, the format converter 34 and the H.263+ encoder 40 are implemented using a programmable DSP chip, such as the Trimedia model TM-1100 provided by Phillips, that is programmed in a conventional manner according to the description provided herein using a combination of C and native assembly-like code. Alternatively, as will be apparent from the description that follows, portions or all of the A/D converter 32, the format converter 34 and/or the H.263+ encoder 40 may be implemented using dedicated, discrete or integrated hardware or combinations of hardware and software, the implementation of which are be apparent to one of ordinary skill in the art given the description that follows. Note that it would be possible to implement the software by programming a general purpose or specialized computer workstation.

Figure 3:
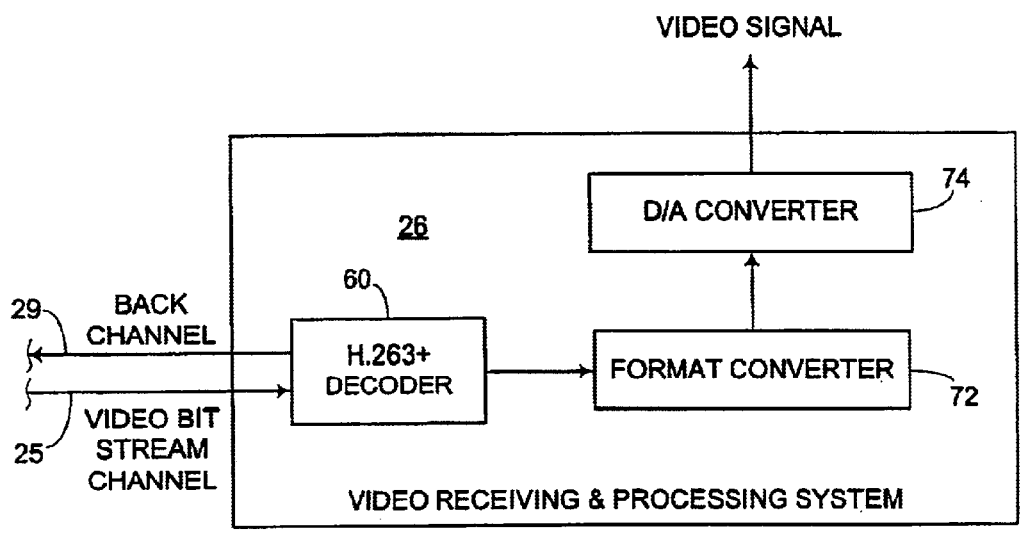
FIG. 3 illustrates a video receiving and processing system according to the present invention.

Referring to FIG. 3, the video receiving and processing system 26 includes an H.263+ decoder 60, a format converter 72 and a D/A converter 74. The H.263+ decoder 60 of the video receiving and processing system 26 receives the video bit stream from the video data channel 25 and provides the back channel signal on the back channel 29. Operation of the H.263+ decoder 60 is described in more detail herein.

The output of the H.263+ decoder 60 is provided to a format converter 72, which converts the output of the H.263+ decoder 60 into a video format that is usable by the display 28 of FIG. 1. In other embodiments, the native output format of the H.263+ decoder 60 may be usable by the display 28, in which case the format converter 72 is not necessary. The format converter 72 may provide conventional digital video format conversion in a manner similar to that of the format converter 34 shown in FIG. 2. Thus, the format converter 72 is not described in more detail.

The output of the format converter 72 is provided to the D/A converter 74, which converts the digital output of the format converter 72 (or, if the format converter 72 is not used, the output of the H.263+ decoder 60) into an analog video signal. The output of the D/A converter 74 may be a conventional analog video signal type that is accepted by the display 28. In embodiments where the display 28 accepts a digital video signal (e.g., VGA) from either the H.263+ decoder 60 directly or from the format converter 72, the D/A converter 74 may not be necessary.

In a preferred embodiment, the format converter 72 and the H.263+ decoder 60 are implemented using a programmable DSP chip, such as the Trimedia model TM-1100 provided by Phillips, that is programmed in a conventional manner according to the description provided herein using a combination of C and native assembly-like code. Alternatively as will be apparent from the description that follows, portions or all of the D/A converter 74, the format converter 72 and/or the H.263+ decoder 60 may be implemented using dedicated, discrete or integrated hardware or combinations of hardware and software, the implementation of which would be apparent to one of ordinary skill in the art given the description that follows. Note that it would be possible to implement the software on a general purpose or specialized computer workstation.

Figure 4:
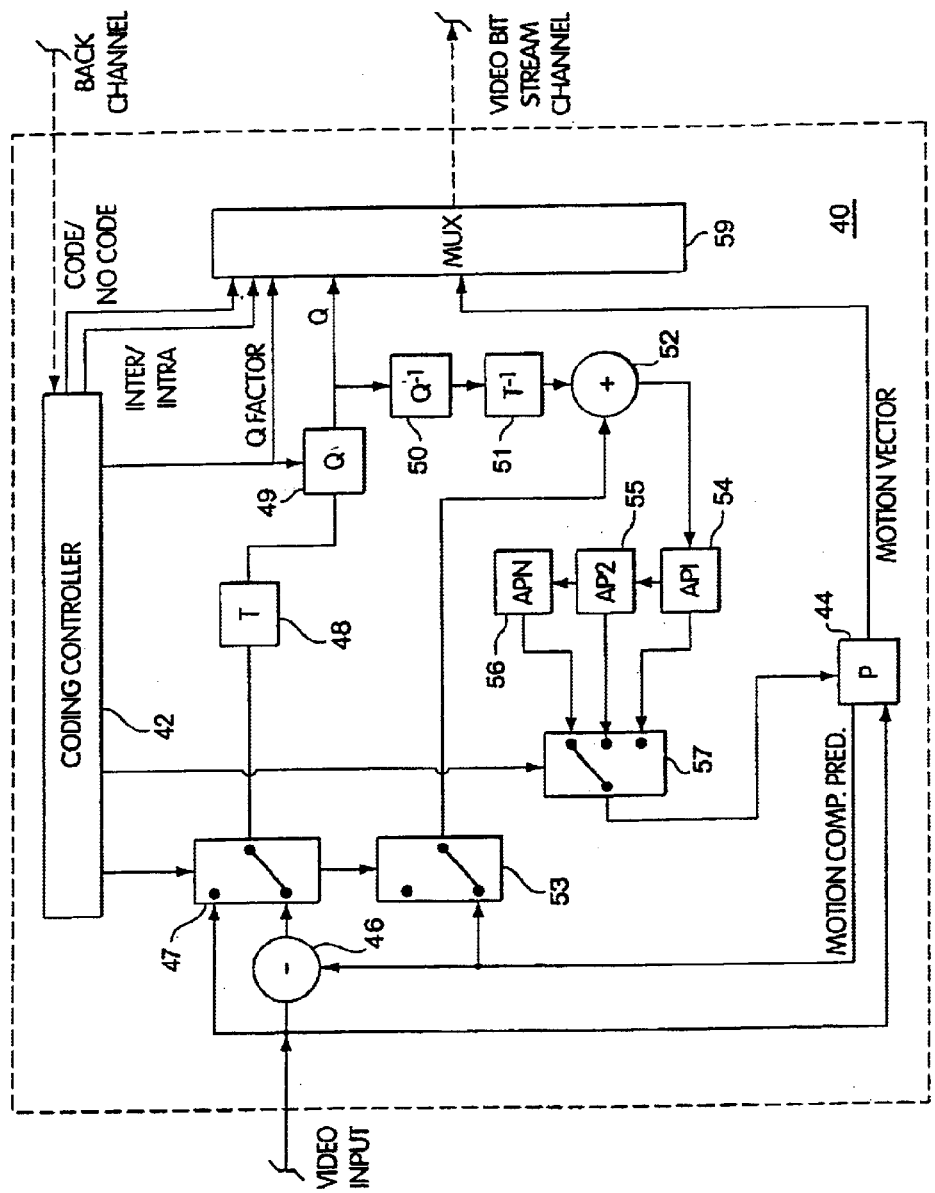
FIG. 4 illustrates an H.263+ encoder according to the present invention.

Referring to FIG. 4, the H.263+ controller 40 of the video processing and transmitting system 24 includes a coding controller 42 that controls operation of the H.263+ encoder 40. The coding controller 42 receives the back channel signal from the back channel 29 and provides various output signals, as described in more detail hereinafter, that become part of the video signal bitstream and are also used to control other portions of the H.263+ encoder 40. In a preferred embodiment, the coding controller 42 is implemented using software that may be run on a processing system having sufficient processing power to provide the signals described in more detail herein. However, as will be apparent to one of ordinary skill in the art, other embodiments may include implementing the coding controller 42 using hardware and/or various combinations of software and hardware.

The H.263+ encoder 40 also includes a reference processor 44 that processes video reference data, in a manner described in more detail hereinafter. The reference processor 44 receives the current video image data from the video input signal to the H.263+ encoder 40 and outputs a motion compensated video image that corresponds to reference data having one or more motion vectors applied thereto, where the motion vector(s) correspond to a translation of a portion of the reference data that approximates the current video image data. The reference processor 44 calculates and outputs the motion vector(s).

Motion compensation of video images and the corresponding calculation of motion vectors is well known in the art and supported by the H.263+ standard. The system described herein works with any motion compensation scheme supported by H.263+ and, as will be apparent to one of ordinary skill in the art, could be adapted in a straight-forward manner to work with other schemes. In a preferred embodiment, the system described herein uses a motion compensation technique analogous to that disclosed in U.S. Pat. No. 5,155,594 to Bernstein et al., which is incorporated by reference herein.

A difference unit 46 receives and determines the difference of two input signals: the motion compensated video image provided by the reference processor 44 and the current video image as provided by the video input signal to the H.263+ encoder 40. The output of the difference unit 46, the difference between the two signals, is the prediction error between the motion compensated video image and the current video image.

The output of the difference unit 46, the prediction error, is provided to a switch 47 that is controlled by the coding controller 42 to switch between the prediction error and the current video image. Both H.263 and H.263+ support transmitting a video image macroblock (i.e., a frame or a portion thereof) by either transmitting the motion vector(s) and the prediction error (called "INTER coding") or by transmitting video data that is not relative to previous video data (called "INTRA coding"). Thus, as described in more detail below, when the coding controller 42 deems it appropriate to transmit the prediction error (i.e., transmit an INTER coded macroblock), the switch 47 is set to provide the output of the difference unit 46. Otherwise, when the coding controller 42 deems it appropriate to transmit INTRA coded data, the switch 47 is set by the coding controller 42 to provide the input video signal.

The output of the switch 47 is coupled to a transform unit 48, which provides a DCT transform of the data in a manner consistent with the H.263+ standard. The output of the transform unit 48 is provided to a quantizer 49 which quantizes the output of the transform unit 48 also in a manner consistent with the H.263+ standard. Note that the coding controller 42 determines the quantization factor and provides that value to the quantizer 49, which is also consistent with the H.263+ standard.

The output of the quantizer 49 is provided to an inverse quantizer 50, which performs the inverse operation of the quantizer 49. The output of the inverse quantizer 50 is provided to an inverse transform unit 51, which provides the inverse operation of the transform unit 48. The output of the inverse transform unit 51 is provided to a summation unit 52, which also receives as input the motion compensated video data from the reference processor 44. Note that the elements 52,51,50 provide the inverse of the operation of the elements 46,48,49, respectively. Thus, the output of the summation unit 52 corresponds to the current video image data provided by the video image signal that is input to the H.263+ encoder. However, it is noted that, due to quantization effects, the output of the summation unit 52 may not be identical to the input video image.

A switch 53 controls whether the summation unit receives the motion compensated video image data or not. Thus, in the case of an INTER coding, the switch 53 provides the motion compensated video data to the summation unit 52 while the switch 47 provides the prediction error to the transform unit 48. On the other hand, in the case of an FNTRA coding, the switch 53 is set so that the motion compensated video image data is not provided to the summation unit 52, causing the output of the summation unit to be the same as the input thereto (i.e., the output of the inverse transform unit 51) while the switch 47 provides the current video image data to the transform unit 47. Accordingly, the output of the summation unit 52 corresponds to the current video image frame irrespective of whether the data is INTER coded or INTRA coded. Thus, the output of the summation unit 52 is analogous to the video image data created by the H.263+ decoder 60 at the video receiving and processing system 26.

The output of the summation unit 52 is provided to a first one of N additional reference storage buffers 54–56. The additional reference storage buffers 54–56 contain video image data corresponding to previous image frames. In a preferred embodiment, each time new video image data is stored in the additional reference storage buffer 54, the video image data already stored in the additional reference storage buffers 54–56 are shifted such that the image stored in the kth one of the buffers 54–56 is subsequently stored in the (k+1)th one of the buffers 54–56. When this occurs, the video image data stored in the Nth one of the buffers 54–56 is discarded. This effect may be achieved by storing the new incoming data in one of the buffers having the oldest data and then pointing to the newest data in a conventional manner.

The data stored in each of the additional reference storage buffers 54–56 are provided to a switch 57 that selects data from one of the buffers 54–56 to be provided to the reference processor 44. The criteria for selection is described in more detail hereinafter.

A video mux 59 receives the various output signals including a flag from the coding controller 42 indicating INTRA or INTER coding and a flag from the coding controller 42 indicating whether a new frame is being transmitted. Note that the H.263+ standard provides a mechanism where, in the case of a video image, or portion thereof, that remains constant, the coding controller 42 may determine not to transmit new data for the static image. Consistent with the H.263+ standard, the mux 59 also receives the quantization signal from the coding controller 42 indicating the quantization value used by the quantization unit 49. Also consistent with the H.263+ standard, the mux 59 receives the quantized signal from the quantization unit 49, and receives the motion compensation vector(s) from the reference processor 44. The various signals are multiplexed to create the video bit stream signal having a format as set forth in the H.263+ standard.

It will be appreciated by one of ordinary skill in the art that any portion, or the entirety, of the H.263+ encoder 40 may be implemented by any combination of hardware and/or software. In a preferred embodiment, the H.263+ encoder 40 is implemented using software. A more detailed explanation of operation of the software is set forth herein.

The H.263+ decoder 60 is consistent with the H.263+ standard and with the description set forth above of the H.263+ encoder 40 and other information provided herein. The H.263+ decoder 60 also uses multiple reference buffers that are selected in a manner discussed in more detail hereinafter. In a preferred embodiment, the H.263+ decoder 60 is implemented with software.

Referring to FIG. 5, a simplified schematic diagram 80 illustrates the system described herein. An H.263+ encoder 82 uses a plurality of reference encode buffers 84, R1, R2, . . . RN. An H.263+ decoder 86 receives the signal from the encoder 82 and recreates the transmitted video image using reference decode buffers 88, R1, R2, . . . RM, where M does not necessarily equal N. Each INTER macroblock that is encoded using one of the encode buffers 84 is subsequently decoded using one of the decode buffers 88. The decoder 86 determines which of the buffers 88 to use for decoding according to information provided by the encoder 82, as described in more detail below.

The series of macroblocks associated with a particular buffer is called a thread. In the example provided herein, there is a one-to-one correspondence between threads and buffers However, other configurations with a ratio of M:N where M does not necessarily equal N, are possible.

The encoder 82 and decoder 86 can cycle through the reference buffers 84,88 by using particular reference buffers on each side for encoding and decoding each macroblock. Thus, a plurality of threads are maintained for each of the buffers 84 at the encoder 82 and a corresponding plurality of threads are maintained for each of the buffers 88 at the decoder 86. The number of threads is controlled by the encoder 82. The decoder 86, on the other hand, can use as many buffers as memory will allow, since transmissions from the encoder 82 simply indicate which portion of previously transmitted data to use for reconstructing the image.

In a system where there are no transmission errors, it is sufficient to use a low number of threads for the encoder 82. However, depending upon the transmission medium, transmission errors can be expected. As set forth in detail below, the system described herein provides a mechanism for efficient recovery from transmission errors and reestablishing the threads using multiple buffers.

Referring to FIG. 6A, a table 90 illustrates a data structure for mapping a particular temporal reference (TR) to a particular buffer. A TR is a mechanism used in video transmission systems and standards, such as H.263+, to distinguish, in time, between different portions of the video signal. For instance, each frame of a video signal may be assigned a particular TR so that a first frame at TR=V1 is distinguishable from a second frame at TR=V2 and, in some instances, the relative timing between the first frame and the second frame may be determined by comparing V1 to V2.

In some embodiments of the H.263+ standard, a TR may have eight bits while in other embodiments a TR may have ten bits. Thus, for an eight bit embodiment, the table 90 may have two hundred and fifty six entries while, for the ten bit embodiment, the table 90 may have one thousand and twenty four entries. The table 90 provides a convenient mechanism for correlating a particular TR with a particular physical buffer. To correlate a particular TR=TR1 with a particular buffer, the table 90 is accessed using TR1 as an index. The entry at the location corresponding to an index of TR1 indicates the physical buffer containing the video data corresponding to TR1. In instances where there is no physical buffer for a particular TR, the table entry for the TR will provide an indication thereof by, for example, being equal to a negative number.

The table 90 is updated as follows: Each time a new macroblock is encoded, it is stored in one of the buffers 54–56 to replace the oldest data therein, as described above.

A first TR associated with the old data from the buffers 54–56 that has been replaced is used to index the table 90 to provided an indication therein that there is now no buffer data associated with the first TR. The indication may be, for example, a negative number that does not correspond to any one of the buffers 54–56. A second TR associated with the new data that has been added to a particular one of the buffers 54–56 is also used to access the table 90 to map the second TR to a particular one of the buffers 54–56 where the data is stored.

Referring to FIG. 6B, a data structure 92 is provided for storing the plurality of elements 93–95 that correspond to the reference frame storage buffers 54–56 of FIG. 4. Each of the elements 93–95 corresponds to one of the buffers 54–56. The element 93 is illustrated in detail as having an entry for the TR corresponding to the buffer, a Boolean entry (FarEndError) indicating whether a far end error has occurred in the receiving and processing system 26, a Boolean entry (FarEndErrorNeedsRecovery) indicating whether the far end needs recovery, an entry (OtherThread) indicating an other thread that used the buffer corresponding to the element 93 for recovery, and an encoder counter (Encoder Counter) entry that is used to calculate an amount of time since a recovery operation was performed for the buffer corresponding to the element 93. Each of the other elements 94,95 contains similar data. Using this data is described in more detail below.

Referring to FIG. 6C, a data structure 96 indicates element 97–99 used by receiving buffers of the H.263+ decoder 60. Each of the elements 97–99 corresponds to one of the receiving buffers. The elements 97 is shown in detail as including a TR field indicating the TR corresponding to the buffer 97 and an error field(BuffError) that indicates as error has occured in connection with receiving the buffer corresponding to the element 97. The other elements 98,99 contain similar data, the use of which is described in more detailed below.

Figure 7:
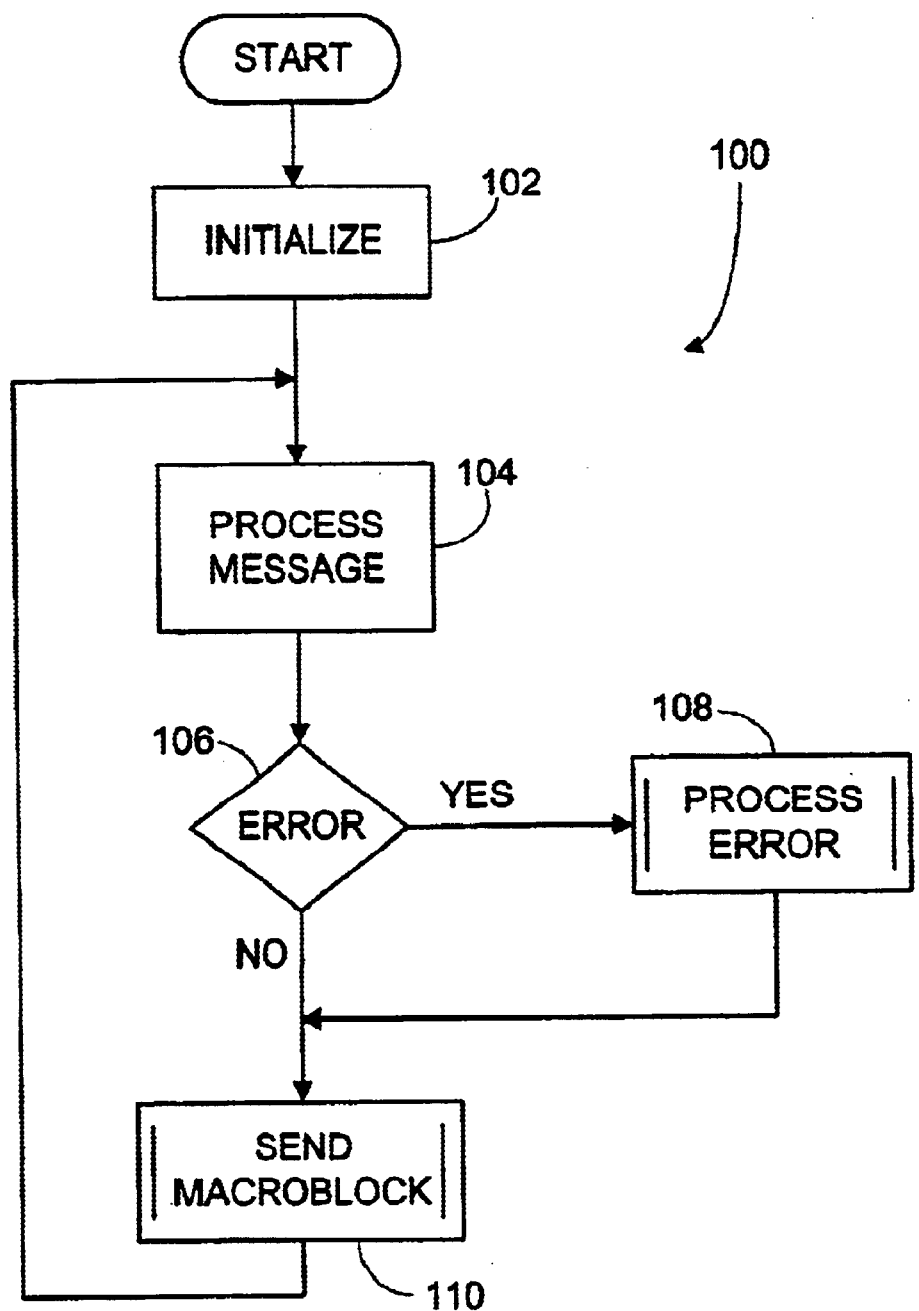
FIG. 7 is a flow chart illustrating overall operation of the encoder according to the present invention.

Referring to FIG. 7, a flow chart 100 illustrates overall operation of the H.263+ encoder 40. At a first step 102, the system is initialized. Initialization of the system is described in more detail below. Following the first step 102 is a step 104 which processes messages received from the video receiving and processing system 26 via the back channel 29. As discussed above, the video receiving and processing system 26 may provide messages to the video processing and transmitting system 24 via the back channel 29.

Following the step 104 is a test step 106 which determines if a message provided by the video receiving and processing system 26 indicates an error in one of the macroblocks transmitted by the video processing and transmitting system 24. If so, then control passes from the test step 106 to a step 108 where the error is processed, in a manner described in more detail below. Alternatively, if it is determined at the test step 106 that there is no error, or following step 108, control passes to a step 110 where the macroblock to be sent is encoded and then transmitted. The step 110 is described in more detail hereafter.

Figure 8:
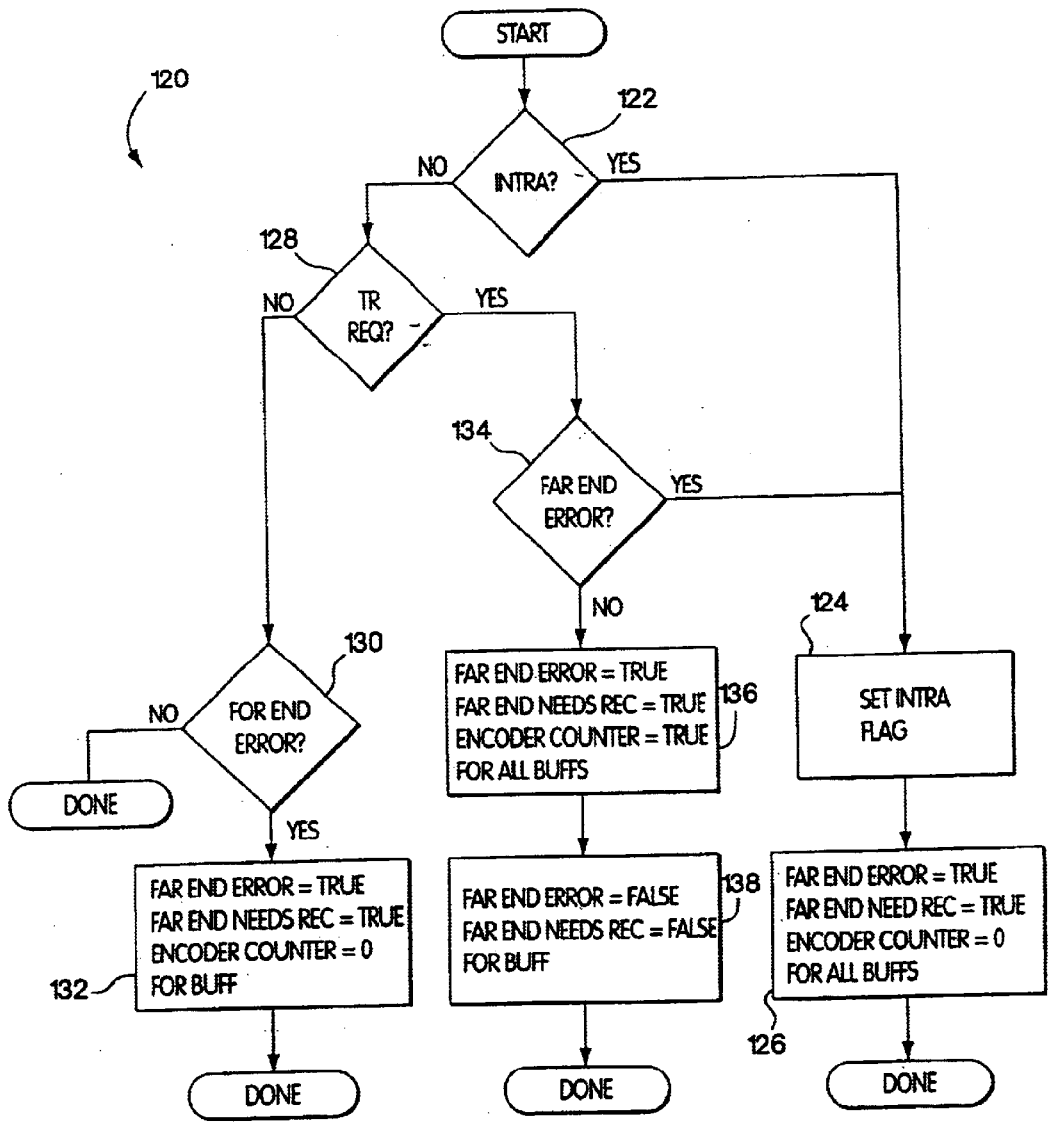
FIG. 8 is a flow chart indicating in more detail a process message step of the flow chart of FIG. 7.

Referred to FIG. 8, a flow chart 120 illustrates operations performmned by the step 108 where an error message is processed. In the system described herein, three possible error messages include an INTRA message, indicating that the receiving and process system 26 has requested an INTRA coded macroblock, a request by the receiving and processing system 26 that a macroblock coded relative to another macroblock corresponding to a particular TR be sent, and an indication by the receiving and processing system 26 that a macroblock corresponding to a particular TR has been received with an error. Although there are other messages that may be provided by the receiving and processing system 26 in connection with conventional H.263+ processing, only the three types of messages listed above are discussed herein.

Processing begins at a test step 122 it is determined if an INTRA message has been sent by the receiving and processing system 26 via the back channel 29. If so, then control passes to a step 124 where an INTRA flag, which is used by follow on processing as described below, is set to TRUE. Following the step 124 is a step 126 where the FarEndError and the FarEndNeedsRecovery fields of all of the buffers is set to TRUE and the EncoderCounter is set to zero. Thus, as described in more detail below, the follow on processing will perform appropriate error recovery for all of the buffers. Following the step 126, processing is complete.

If it is determined at the test step 122 that an INTRA message has not been sent, then control passes from the step 122 to a step 128 where it is determined if the receiving and processing system 26 has requested a macroblock be INTER coded with respect to another macroblock corresponding to a particular TR. If not, then control passes from the step 128 to a test step 130 where it is determined if the receiving and processing system 26 has indicated an error for a macroblock corresponding to particular TR. If not, then processing is complete (or other types of messages, not discussed herein, are processed). Otherwise, control transfers from a step 130 to a step 132 where the FarEndError field corresponding to the buffer for the particular TR is set to TRUE, the FarEndNeedsRecovery for buffer corresponding to the particular TR set to TRUE, and the EncoderCounter for the buffer corresponding to the particular TR is set to zero. Note that, as discussed above, the fields corresponding to a particular TR may be determined using the TR to buffer table 90 shown in FIG. 6A.

If it is determined at the step 128 that the receiving and processing system 26 has requested that a macroblock be coded with respect to another macroblock corresponding to a particular TR, then control passes from the step 128 to a test step 134 where it is determined if the buffer corresponding to the particular TR (which is accessed using the table 90 of FIG. 6A) has a far end error by examining the FarEndError field for the buffer. If so, then control passes from the step 134 to the step 124 where the steps 124, 126 for processing an INTRA are performed. Note that, in the embodiment illustrated herein, it is assumed that when the receiving and processing system 26 requests that a macroblock be coded relative to another macroblock corresponding to a particular TR, all of the other buffers are potentially in error. Thus, when it is determined at the step 134 that the buffer corresponding to the TR also has a far end error, an INTRA operation is performed.

If it is determined at the test step 134 that the TR set forth in the request does not have a far end error, then control passes from the step 134 to a step 136 where all of the buffers are set to indicate that the FarEndError field is TRUE and the FarEndNeedsRecovery field is TRUE. However, following the step 136 is a step 138 where the buffer corresponding to the TR is set to indicate that the FarEndError field is FALSE and the FarEndNeedsRecovery field is FALSE. The steps 136, 138 are consistent with the assumptions made that when the receiving and processing system 26 request that a macroblock be coded relative to another macroblock corresponding to a particular TR, all of the other threads may be in an error state.

Figure 9A:
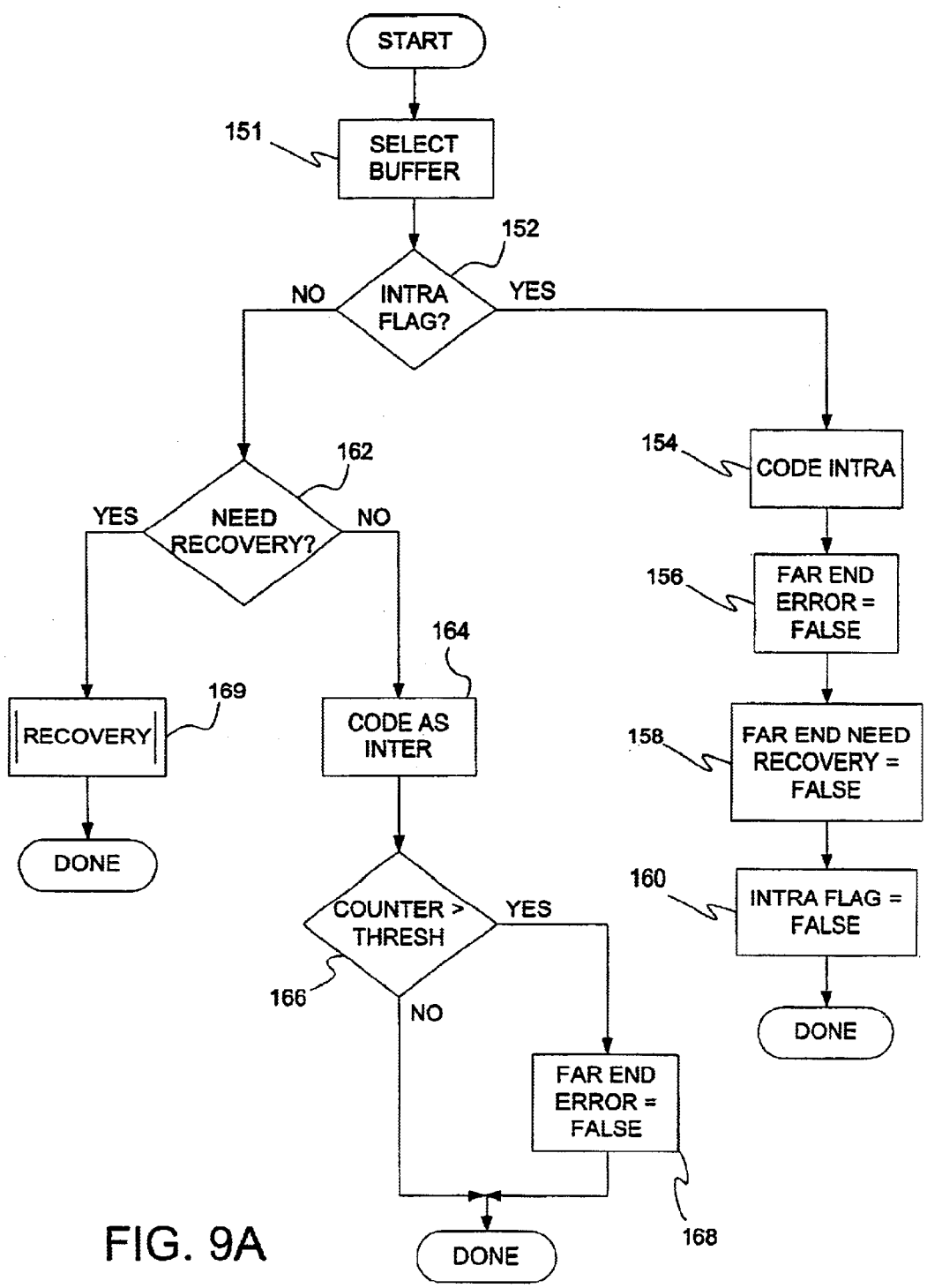
FIGS. 9A and 9B are flow charts indicating in more detail operation of the send frame step of the flow chart of FIG. 7.

Referring to FIG. 9A, a flow chart 150 illustrates operations performed by the step 110 of FIG. 7 where a macroblock is transmitted by the H.263+ encoder 40. At a first step, one of the buffers 54–56 is selected to store the macroblock being sent. Also, for INTER coding, the selected one of the buffers 54–56 is used for the relative coding of the current macroblock. In a preferred embodiment, the current macroblock is stored in the buffer 54–56 containing the oldest macroblock so that the oldest macroblock is overwritten. However, it will be apparent to one of ordinary skill in the art that other techniques may be used to select which one of the buffers 54–56 to use to store the current macroblock.

Following the step 151 is a step 152 where it is determined if the INTRA flag, discussed above in connection with FIG. 8, has been set. If so, then control passes from step 152 to a step 154 where the current macroblock is INTRA coded and transmitted. Following the step 154 is a step 156 where the FarEndError field for the buffer is set to FALSE. Note that sending an INTRA frame handles recovery of any far end error, assuming that the INTRA frame is properly received. Following step 156 is a step 158 where the FarEndNeedsRecovery field for the buffer is also set to FALSE, for reasons analogous to setting the FarEndError field to FALSE. Following the step 158 is a step 160 where the INTRA flag, which was tested at step 152, is set to FALSE to prevent any subsequent INTRA frames from being sent unnecessarily.

If it is determined at the test step 152 that the INTRA flag is not set, then control passes from the step 152 to a step 162 where it is determined if the thread corresponding to the buffer to be encoded needs recovery by checking the FarEndNeedsRecovery field for the buffer. Setting the FarEndNeedsRecovery field to TRUE or to FALSE is discussed above in connection with message processing and, in addition, is also discussed below in connection with other processing corresponding to encoding a macroblock.

If it is determined at the step 162 that the FarEndNeedsRecovery field for the particular buffer is FALSE, then control passes from a step 162 to a step 164 where the macroblock is INTER coded in a manner consistent with the H.263+ standard. The new INTER coded macroblock continues the thread. Following step 164 is a test step 166 where it is determined if the EncoderCounter for the buffer is greater than a particular threshold. The EncoderCounter is set to zero when an error occurs (i.e., when FarEndError is set to TRUE) and is then incremented according to the wall clock time to determine when to clear the error. The value used for the threshold is a design choice based on a variety of functional factors familiar to one of ordinary skill in the art. In a preferred embodiment, the threshold is set to correspond to a round trip transmission time and processing time for an error. In that way, the far end error is cleared in an amount of time after the recovery process corresponding to the amount of time it takes for the receiving and processing system 26 to receive the recovery information and return an error if there is an error corresponding to the recovery information.

If it is determined at the test step 166 that the EncoderCounter does not exceed the threshold, then processing is complete. Otherwise, control passes from step 166 to step 168 where the FarEndError field for the buffer is set to FALSE, indicating a successful recovery and the passage of a sufficient amount of time since the recovery process began.

If it is determined at the test step 162 that the buffer being encoded needs recovery (i.e., FarEndNeedsRecovery is TRUE), then control passes from step 162 to step 169 where recovery is performed, as described below.

Figure 9B:
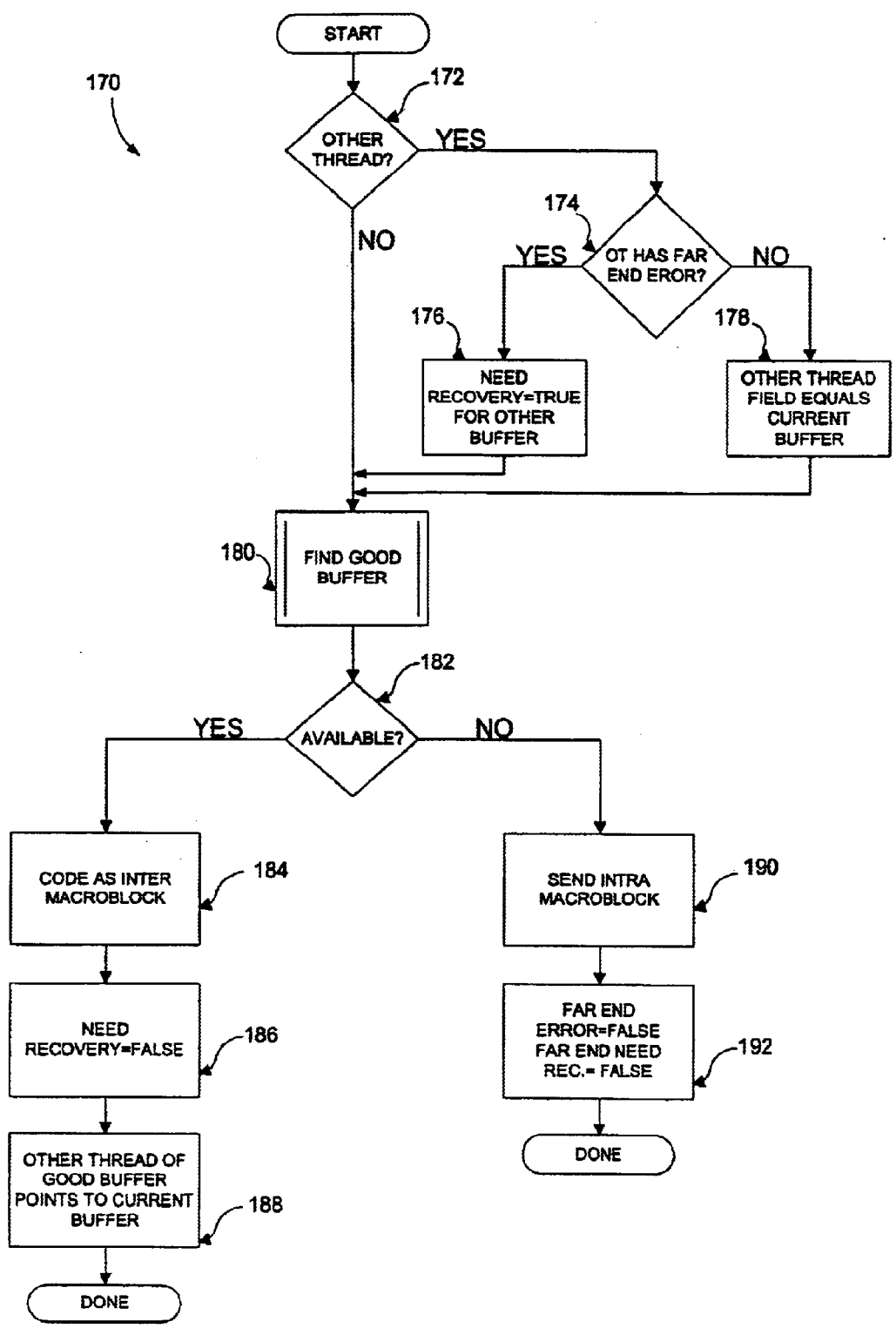

Referring to FIG. 9B, a flow chart 170 illustrates the step 169 for performing recovery of FIG. 9A. Processing begins at a test step 172 where it is determined if another thread for another buffer has used the current buffer to perform a recovery. The determination is made by testing whether the OtherThread field equals the index of the current buffer. If the OtherThread field does not equal the index of the current buffer, indicating that the current buffer has been used for error recovery, then control passes to a test step 174 where it is determined if the other buffer corresponding to the OtherThread field still has a far end error (i.e., the FarEndError field for the other buffer is set to TRUE). If so, then control passes to a step 176 where the FarEndNeedsRecovery field for the other buffer is set to TRUE. Thus, the next time the other buffer is used, it will be determined that the thread corresponding to the other buffer requires recovery because the other buffer recently used the current buffer, which has an error.

If it is determined that at the test step 174 that the FarEndError field of the other buffer is FALSE, then control passes to a step 178. In that case, the FarEndError field being FALSE indicates that a sufficient amount of time has passed since the other buffer used the current buffer for recovery so that the other buffer is probably not tainted by the error in the current buffer. In that case, at the step 178, the other buffer is uncoupled from the current buffer by setting the OtherThread field of the current buffer to point to the current buffer. Thus, the next time the current buffer is being processed and reaches the step 172, the result of the test will be FALSE.

Following one of the steps 172, 176, 178 is a step 180 where a good buffer is found to use for recovery of the error of the current buffer. Finding a good buffer at step 180 is discussed in more detail hereinafter.

Following the step 180 is a test step 182 where it is determined if any good buffer has been found at the step 180. If so, then control passes from a step 182 to a step 184 where a macroblock is INTER coded using the good buffer that was found at the step 180. Following the step 184 is a step 186 where the FarEndNeedsRecovery field of the current buffer is set to FALSE, since coding the macroblock with the good buffer at the step 184 handles the recovery. Following the step 186 is a step 188 where the OtherThread field of the buffer used for recovery is set to point to the current buffer. Following the step 188, processing is complete.

If it is determined at the step 182 that no good buffer is available, then control passes from the step 182 to a step 190 to INTRA code the macroblock. Note that, if there are no other good buffers, then an INTRA coding is necessary since the current buffer is also in error. Following the step 190 is a step 192 where the FarEndError and FarEndNeedsRecovery fields are set to FALSE. Following the step 192, processing is complete.

Figure 10:
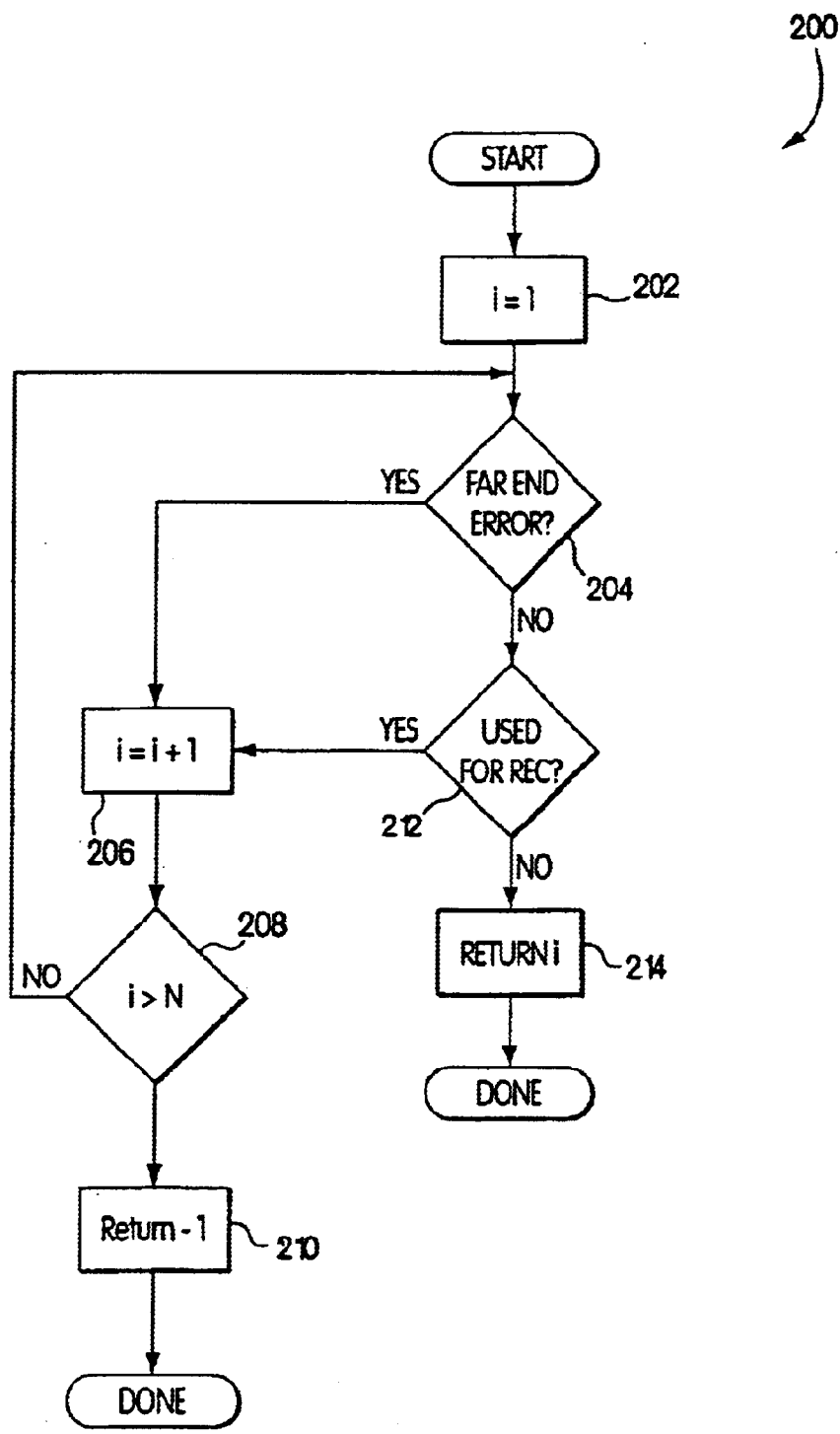
FIG. 10 is a flow chart indicating in more detail the find good buffer step of FIG. 9B.

Referring to FIG. 10, a flow chart 200 illustrates in more detail the step 180 of finding a good buffer to be used for error recovery. At a first step 202, an index i, is set to one. The index i will be used to iterate through the buffers to find a new buffer to be used as a reference buffer for recovery of the current buffer.

Following this step 202 is a test step 204 where it is determined if the FarEndError field for the buffer being examined, the ith buffer, is TRUE. If a particular buffer has a far end error, then it is not appropriate to use the buffer as a reference buffer for error recovery. Accordingly, if it is determined that the step 204 that the buffer being examined has a far end error, then control passes from the step 204 to a step 206 where the index, i, is incremented. Following step 206 is a test step 208 where it is determined if the index, i, is greater than N, the total number of buffers. If so, then control passes from the step 208 to a step 210 where negative one is returned. A software routine for finding a good buffer may return a negative number indicating that no good buffer were found. The returned value may be tested accordingly at the test step 182 of FIG. 9B to decide if there are any good reference buffer to be used for recovery.

If it is determined that the test step 208 that the index, i, is still within the range of the number of buffers, then control passes from the test step 208 back to step 204 to test the next buffer. If it is determined that the test step 204 that the FarEndError field for the buffer is FALSE, then, control passes from the step 204 to a test step 212. At the test step 212, it is determined if the buffer being examined, the ith buffer, is currently being used by another buffer for error recovery. Note that, even if the FarEndError field is determined to be FALSE at the test step 204, it is still possible that there is an error in the ith buffer that has not been received yet by the H.263+ encoder, due to transmission and processing delays. Thus, in a preferred embodiment, each buffer is used by, at most, one other buffer, as a reference buffer for error recovery. That way, if it is later determined that a reference buffer used for error recovery buffer is also in error, then the propagation of that error is minimized. In other embodiments, it is possible to use a single buffer for error recovery of multiple other buffers.

If it is determined at the test step 212 that the ith buffer is being used by another buffer, then control passes from the step 212 to the step 206 where the index, i, is incremented and processing continues from the step 206, as described above. Otherwise, if it is determined at the test step 212 that the ith buffer is not being used by other buffers, then control passes from the step 212 to a step 214 where the index, i, is returned from the find good buffer routine. In that case, the ith buffer will be used as a reference to encode the current buffer in the encode routine shown in FIGS. 9A and 9B.

Figure 11:
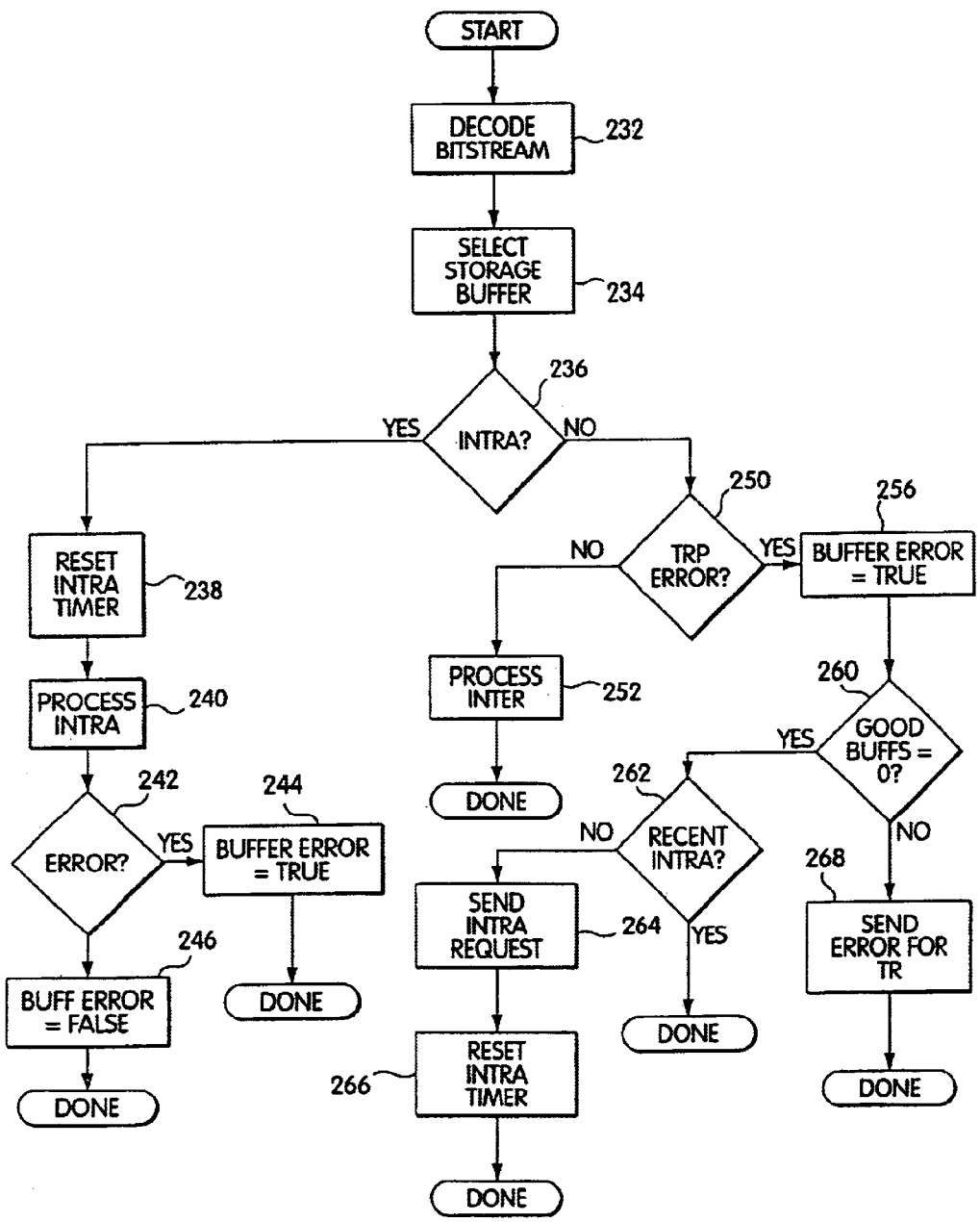
FIG. 11 is a flow chart illustrating operation of the H.263+ decoder according to the present invention.

Referring to FIG. 11, a flow chart 230 illustrates operation of the H.263+ plus decoder 60 of the video receiving and processing system 26. As discussed above, the H.263+ decoder 60 may be implemented using software. However, as will be apparent to one of ordinary skill in the art from discussion which follows, the H.263+ decoder 60 may be implemented using hardware or an appropriate combination of hardware and software.

At a first step 232, the received bit stream is decoded. Decoding the bit stream at the step 232 is performed in a conventional manner in accordance with the H.263+ standard. Following the step 232 is a step 234 where a receiving buffer, for storing the received frame, is selected. Although there may be many possible techniques for selecting a particular receiving buffer, in a preferred embodiment, the receiving buffer is selected to be the oldest storage buffer (i.e., the storage buffer having the macroblock corresponding to the oldest temporal reference, TR).

Following the step 234 is a test step 236 which determines if an INTRA coded macroblock has been sent. If so, then control passes from the step 236 to a step 238 where an INTRA timer is reset. The INTRA timer is used by the decoder 60 to prevent a situation where multiple INTRA requests are sent from the decoder 60 to the encoder 40 (via the back channel 29) in a relatively short amount of time. Each time an INTRA coded macroblock is sent or received, the INTRA timer is reset. Subsequently, the INTRA timer is incremented, in a conventional manner, according to the wall clock time. The decoder does not send an INTRA request if the timer is below a certain threshold which, in a preferred embodiment, corresponds to the round trip transmission and processing time.

Following the step 238 is a step 240 where the INTRA coded macroblock is decoded in a conventional manner according to the H.263+ standard. Following the step 240 is a test step 242 where it is determined if an error has occurred (e.g., a transmission error) while decoding the INTRA coded block. If so, then control passes to a step 244 where the BuffError field for the receiving buffer is set to TRUE. Alternatively, if there is no error in decoding the INTRA coded macroblock, then control passes from the step 242 to a step 246 where the BuffError field for the buffer is set to FALSE.

If it is determined at the test step 236 that an INTRA coded macroblock has not been sent, then control passes from the test step 236 to a test step 250 where it is determined if the INTER coded macroblock which has been sent results in an error. Note that, when an INTER coded macroblock is sent, it is necessary for the decoder 60 to have a reference macroblock that was used to code the current INTER coded macroblock. According to the H.263+ standard, an INTER coded macroblock includes an identifier of a temporal reference to be used for prediction (TRP) that corresponds to the reference macroblock. The decoder 60 uses the TRP to index the table 90 of FIG. 6A to ascertain if the reference macroblock is available. If the corresponding entry in the table 90 indicates that the reference macroblock is not available (e.g., the entry is a negative number), then the test step 250 deems this an error. Thus, the possible errors that can be detected at the step 250 include an error that occurs when the TRP for the received INTER coded macroblock does not correspond to any macroblocks stored at the decoder 60 or when the macroblock corresponding to the TRP does exist but has an error associated therewith (i.e., BuffError is TRUE). In a preferred embodiment, threads with BuffError set to TRUE are not used for display except when all of the threads have BuffError set to TRUE, in which case all of the threads will be used for display.

If it is determined at the step 250 that there is not an error associated with the TRP, then control passes to the step 252 where the INTER coded macroblock is decoded using the buffer associated with the TRP which, as discussed above, is determined by accessing the table 90 that correlates TR's with buffers. Following the step 252 is a step 254 where the newly decoded macroblock is stored in the buffer. Following the step 254, processing is complete.

If it is determine at the test step 250 that an error has occurred, then control passes from the step 250 to a step 256 where the BuffError field for the receiving buffer is set to TRUE. Following the step 256 is a test step 260 where the number of good buffers remaining at the decoder is determined in a conventional manner by examining the BuffError field for all of the buffers. If there are no remaining good buffers, then control passes from the step 260 to a step 262 which determines if an INTRA request has been processed recently. As discussed above in connection with the step 238, an INTRA timer is used to prevent multiple NTRA's from being sent by the decoder in a relatively short period of time. If it is determined at the test step 262 that an INTRA has been processed recently, then processing is complete. In that case, the decoder simply waits for the INTRA to cause the encoder to begin sending INTRA coded macroblock(s).

If it is determined at the test step 252 that an INTRA frame has not been processed recently, control passes from the step 262 to a step 264 where an INTRA request is sent to the encoder. Following the step 264 is a step 266 where the INTRA timer is reset. Following the step 266, processing is complete.

If it is determined at the test step 260 that the number of good buffers at the decoder is greater than zero, then control passes from the test step 260 to a step 268 where the decoder sends an error message to the encoder indicating the error associated with the received macroblock. Note that, as discussed above in connection with FIG. 8 (processing messages) and FIGS. 9A and 9B (sending a macroblock), there are two possible types of error messages that cause different processing by the encoder: a first type that reports the error for the TR and a second type that requests a particular that a macroblock be INTER coded relative to a macroblock corresponding to a particular TR. In a preferred embodiment, the message sent at the step 268 reports the error for the macroblock corresponding to the TR. In other embodiments, the message sent at the step 268 requests that a subsequent macroblock be encoded relative to a macroblock having a particular TR. Following the step 268 processing is complete.

The system described herein may be initialized in any number of ways apparent from the description provided herein. In a preferred embodiment, the TR field for all of the buffers for the encoder 40 and the decoder 60 are set to a negative number, to indicate that there is no TR stored in any of the buffers. Then, the encoder 40 transmits the first frame as an INTRA coded macroblock and transmits the first N macroblocks (where N equals the number of buffers) as INTER coded macroblocks relative to either the first INTRA frame or to any of the other macroblocks. In other embodiments, it is possible to initially transmit N INTRA frames.

The number of buffers used by the processing and video transmitting and processing system 24 and the video receiving and processing system 26 may be chosen based on a variety of functional factors related to performance. Generally, increasing the number of buffers at the encoder 40 decreases the number of INTRA macroblocks needed since there is a greater number of threads which can be used for recovery. However, increasing the number of buffers at the encoder 40 may increase the amount of information that needs to be transmitted, since each thread is constructed using the difference from the previous macroblock in the thread. For a system with N buffers, each macroblock of a thread represents a difference between the current macroblock and the macroblock that occurred N frames prior to the current macroblock which, generally, is less predictive than macroblocks that occurred less that N frames prior to the current macroblock. Thus, for a completely error-free system, using one thread at the encoder may be optimal. As described in more detail below, a preferred embodiment of the system described herein dynamically adjusts the number of threads at the encoder based on the number errors that occur in a given time. Note that, for the decoder 60, it is useful to use the maximum number of buffers as practical, since the decoder uses previously-received received macroblocks to decode INTER coded macroblocks.

Figure 12:
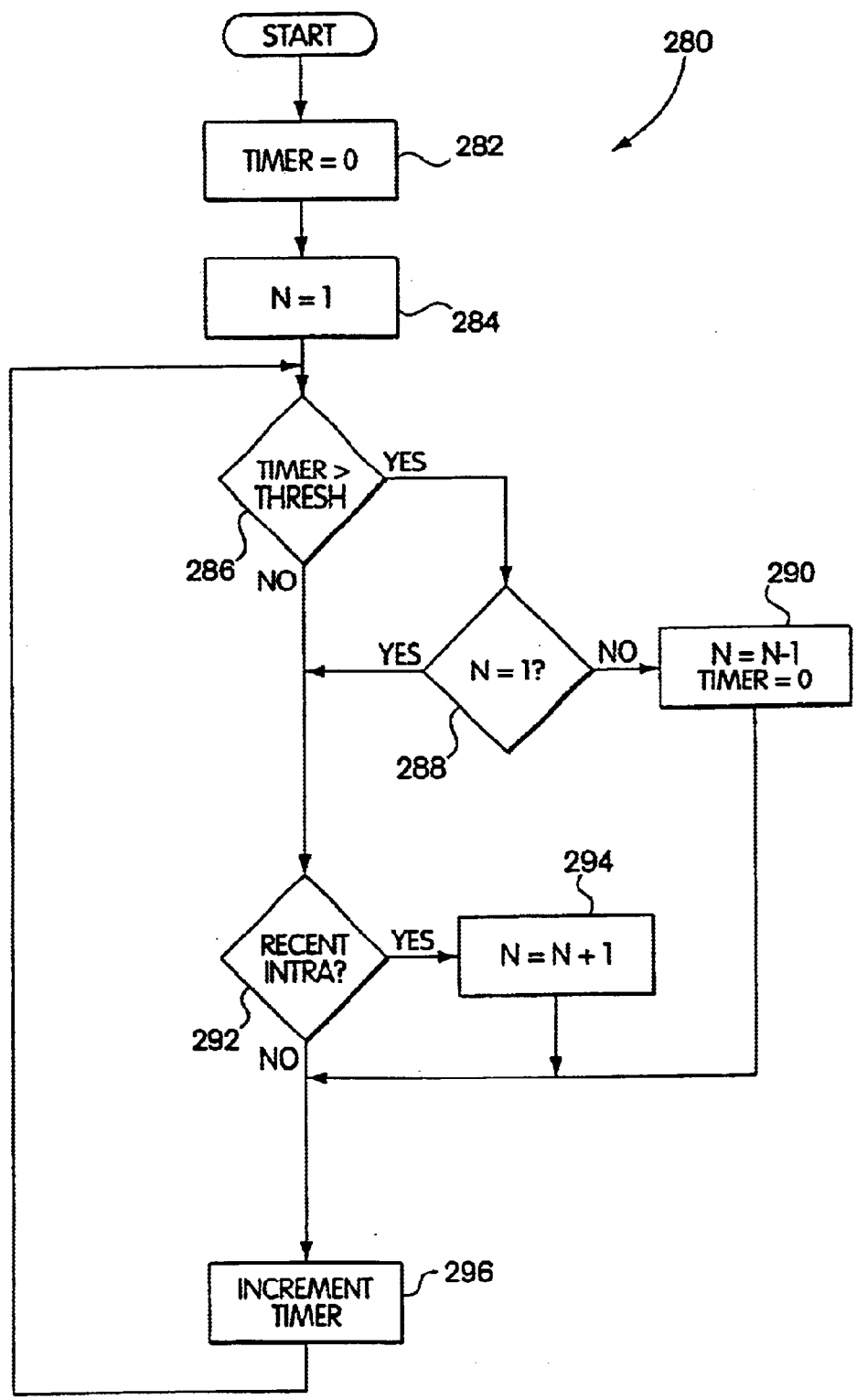
FIG. 12 is a flow chart illustrating adjusting a number of reference buffers according to the present invention.

Referring to FIG. 12, a flow chart illustrates dynamically adjusting N, the number of buffers that are used by the encoder 40. At a first step 282, a Timer is set to zero. Following the step 282 is a step 284 where N, the number of buffers, is set to one. Following the step 284 is a test step 286 where it is determined if the Timer is greater than a predetermined threshold. The Timer is used to determine how much time has passed since an INTRA coding based on buffer errors has occurred. If a sufficient amount of time has passed without such an INTRA coding, then the number of buffers is decreased. The amount of time chosen for the threshold amount of time is a design choice. In a preferred embodiment, the threshold is set to one minute.

If it is determined at the test step 286 that the Timer is greater than the threshold, then control passes from the step 286 to a test step 288 where it is determined if N, the number of buffers, equals one, the minimum number of buffers. In other embodiments where the minimum number of buffers is other than one, the step 288 would test if N equals that minimum number. If it is determined at the test step 288 that N is not one, then control passes from the step 288 to a step 290 where the number of buffers is decreased by one. Otherwise, if N equals one, the step 290 is not performed.

If it is determined at the step 286 that the Timer is not greater than the threshold, then control passes from the step 286 to a test step 292 where it is determined if there has been a recent INTRA coding due to buffer errors. If so, then control passes from the step 292 to a step 294 where the number of buffers is increased by one. In some embodiments, there may be an additional test performed prior to the step 294 to determine if a maximum number of buffers has been exceeded. The maximum number may relate to the amount of memory that is available for use by the encoder 40. If it is determined at the test step 292 that there has not been a recent INTRA coding due to buffer errors, then control passes from the step 292 to a step 296, where the Timer is incremented. The step 296 also follows the steps 290, 294. Following the step 296, control passes back to the step 286 to iterate on the next loop.

Note that, in other embodiments, it is possible to increase and decrease the number of buffers by an amount other than one. In some embodiments it is possible to decrease the number of buffers by one amount and increase the number of buffers by another amount. In addition, the amounts may be made to vary rather than being fixed.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of transmitting and receiving video data, comprising:
   an encoder storing macroblocks in a plurality of reference buffers;
   the encoder transmitting macroblocks that are encoded relative to a selected one of the reference buffers;
   a decoder receiving the macroblocks in a plurality of reference buffers;
   the decoder determining if a particular one of the macroblocks is in error and indicating such error to the encoder; and
   in response to the decoder indicating an error with respect to a particular one of the macroblocks, the encoder using a second one of the reference buffers for error recovery if there is no error associated with the second reference buffer.

2. A method, according to claim 1, further comprising:
   in response to the decoder indicating an error with respect to a particular one of the macroblocks, the encoder and the decoder indicating a reference buffer associated with the macroblock is in error; and
   in response to the decoder indicating an error with respect to a particular one of the macroblocks and all of the encoder reference buffers having errors associated therewith, the encoder transmitting at least one macroblock that is encoded independent of any other macroblocks.

3. A method, according to claim 1, further comprising:
in response to the decoder indicating an error with respect to a particular one of the macroblocks, the encoder and the decoder indicating a reference buffer associated with the macroblock is in error; and
in response to all of the reference buffers of the decoder having errors associated therewith, the decoder transmitting a request to the encoder to transmit at least one macroblock that is encoded independent of any other macroblocks.

4. A method, according to claim 3, wherein in response to the request, the encoder transmits at least one macroblock that is encoded independent of any other macroblocks.

5. A method, according to claim 1, wherein the encoder using a second one of the reference buffers for error recovery includes:
coding a macroblock using a second one of the reference buffers as a reference; and
marking the selected one of the reference buffers as having an error.

6. A method, according to claim 5, further comprising:
in response to marking the selected one of the reference buffers as having an error, the encoder setting a timer to indicate an amount of time since the error occurred; and
in response to the amount of time since the error occurred being greater than a predetermined threshold, the encoder clearing the error associated with the selected one of the reference buffers.

7. A method, according to claim 6, wherein the predetermined threshold corresponds to a round trip transmission and processing time between the encoder and the decoder.

8. A method, according to claim 1, wherein the number of reference buffers used is increased in response to errors requiring the encoder to transmit at least one macroblock that is encoded independent of any other macroblocks and decreased if, after a predetermined amount of time, no errors requiring the encoder to transmit at least one macroblock that is encoded independent of any other macroblocks occur.

9. A method, according to claim 1, further comprising:
associating each macroblock with a temporal reference number; and
providing a table that maps each temporal reference number with one of:
a particular one of the reference buffers and
a value indicating that a macroblock corresponding to a temporal reference number is not being stored.

10. A method of transmitting video data between an encoder and a decoder, comprising:
the encoder storing macroblocks in a plurality of reference buffers;
the encoder transmitting macroblocks that are encoded relative to a selected one of the reference buffers;
in response to an error with respect to a macroblock corresponding to the selected one of the reference buffers, the encoder using a second one of the reference buffers for error recovery if there is no error associated with the second buffer.

11. A method, according to claim 10, further comprising:
in response to an error with respect to a macroblock and all of the reference buffers having errors associated therewith, the encoder transmitting at least one macroblock that is encoded independent of any other macroblocks.

12. A method, according to claim 10, wherein in response to a receiving a request, the encoder transmits at least one macroblock that is encoded independent of any other macroblocks.

13. A method, according to claim 10, wherein the encoder using a second one of the reference buffers for error recovery includes:
coding a macroblock using a second one of the reference buffers as a reference; and
marking the selected one of the reference buffers as having an error.

14. A method, according to claim 13, further comprising:
in response to marking the selected one of the reference buffers as having an error, the encoder setting a timer to indicate an amount of time since the error occurred; and
in response to the amount of time since the error occurred being greater than a predetermined threshold, the encoder clearing the error associated with the first one of the buffers.

15. A method, according to claim 14, wherein the predetermined threshold corresponds to a round trip transmission and processing time between the encoder and the decoder.

16. A method, according to claim 10, wherein a number of reference buffers used is increased in response to errors requiring the encoder to transmit at least one macroblock that is encoded independent of any other macroblocks and decreased if, after a predetermined amount of time, no errors requiring the encoder to transmit at least one macroblock that is encoded independent of any other macroblocks occur.

17. A method, according to claim 10, further comprising:
associating each macroblock with a temporal reference number; and
providing a table that maps each temporal reference number with one of
a particular one of the reference buffers and
a value indicating that a macroblock corresponding to a temporal reference number is not being stored.

18. A method of receiving video data from an encoder, comprising:
a decoder receiving into a plurality of reference buffers a plurality of macroblocks that are coded relative to a plurality of reference buffers corresponding to the plurality of macroblocks;
the decoder determining if there is an error with respect to a particular macroblock; and
in response to an error with respect to a particular macroblock, the decoder indicating a selected one of the reference buffers associated with the particular macroblock is in error.

19. A method, according to claim 18, further comprising:
following indicating an error in a selected one of the reference buffers, the decoder receiving a macroblock coded relative to a second one of the reference buffers.

20. A method, according to claim 18, further comprising:
following indicating an error in the selected reference buffer, and in response to all reference buffers of the decoder having errors associated therewith, the decoder requesting at least one macroblock that is encoded independent of any other macroblocks.

21. A method, according to claim 20, further comprising:
following requesting at least one macroblock that is encoded independent of any other macroblocks, the decoder resetting a timer; and
the decoder forgoing requesting another macroblock that is encoded independent of any other macroblocks until the timer has exceeded a predetermined threshold.

22. An apparatus that transmits video data to a decoder, comprising:
- a plurality of reference buffers that store a plurality of macroblocks;
- a reference processor unit, coupled to said plurality of reference buffers, that provides at an output at least one motion compensation vector and a motion compensated image of a macroblock provided thereto;
- a difference unit, coupled to an input video signal and to said output of said reference processor unit, to provide a difference between the input video signal and said output of said reference processor unit at an output; and
- a coding controller that controls transmission of video data to provide each macroblock as one of:
  - a macroblock that is encoded independent of any other macroblocks and
  - a macroblock coded relative to said output provided by said difference unit;
  - wherein, in response to an error for a macroblock corresponding to a first one of said reference buffers, said coding controller causes said reference processor unit to use a second one of said reference buffers for error recovery if there is no error associated with said second reference buffer.

23. An apparatus, according to claim 22, wherein, in response to all of the reference buffers having errors associated therewith, said coding controller causing transmission of at least one macroblock that is encoded independent of any other macroblocks.

24. An apparatus, according to claim 22, wherein, in response to receiving a request, said coding controller causes transmission of at least one macroblock that is encoded independent of any other macroblocks.

25. An apparatus, according to claim 22, wherein a the number of reference buffers used is increased in response to errors associated with the reference buffers and is decreased in response to not having errors associated with the reference buffers after a predetermined amount of time.

26. A computer storage medium containing a computer program having a series of program instructions for encoding a video stream for transmission to a decoder, the computer program instructions comprising the steps of:
- storing macroblocks in a plurality of reference buffers;
- transmitting macroblocks that are encoded relative to a selected one of the reference buffers; and
- using a second one of the buffers for error recovery if there is no error associated with the second buffer in response to determining an error with respect to a particular macroblock corresponding to the selected one of the reference buffers.

27. A computer storage medium, according to claim 26, the computer program instructions further comprising the step of:
- transmitting at least one macroblock that is encoded independent of any other macroblocks in response to determining an error with respect to a particular macroblock and all of the reference buffers having errors associated therewith.

28. A computer storage medium, according to claim 26, the computer program instructions further comprising the step of:
- detecting a request for at least one macroblock that is encoded independent of any other macroblocks.

29. A computer storage medium, according to claim 26, wherein using a second one of the buffers for error recovery includes:
- coding a macroblock using a second one of the reference buffers as a reference; and
- marking the selected one of the reference buffers as having an error.

30. A computer storage medium, according to claim 29, the computer program instructions further comprising the steps of;
- setting a timer to indicate an amount of time since an error occurred in response to marking the one of the reference buffers as having an error; and
- clearing the error associated with the selected one of the reference buffers in response to the amount of time since the error occurred being greater than a predetermined threshold.

31. A computer storage medium, according to claim 30, wherein the predetermined threshold corresponds to a round trip transmission between an encoder and the decoder and processing time.

32. A computer storage medium containing a program having a series of program instructions for receiving video data from an encoder, the computer program instructions comprising the steps of:
- receiving into a plurality of reference buffers a plurality of macroblocks that are coded relative to a selected one of the plurality of reference buffers corresponding to a plurality of macroblocks;
- determining if there is an error with respect to a particular macroblock; and
- requesting a particular macroblock be resent and marking in error a the selected one of the reference buffers associated with the particular macroblock in response to determining an error with respect to the particular macroblock.

33. A computer storage medium, according to claim 32, the computer program instructions further comprising the step of:
- receiving a macroblock coded relative to a second one of the reference buffers following requesting the particular macroblock be resent.

34. A method of transmitting video data between an encoder and a decoder, comprising:
- an encoder storing macroblocks in a plurality of reference buffers, each macroblock being associated with a temporal reference number;
- providing a table that maps each temporal reference number with a particular one of the reference buffers, wherein for a subset of the temporal reference numbers, a value indicates that none of the buffers correspond thereto;
- the encoder transmitting macroblocks that are encoded relative to a selected one of the reference buffers; and
- in response to receiving an error message indicating an error with respect to a particular one of the macroblocks encoded relative to the selected one of the reference buffers, the encoder using the table and a second one of the reference buffers for error recovery if there is no error associated with the second reference buffer.

35. A method, according to claim 34, further comprising:
- for each reference buffer, providing a data structure containing values for a corresponding one of the temporal reference numbers, an indication that an error has occurred, an indication that an error requires recovery, an indication that the buffer has been used for recovery of another thread, and a timer indicating an amount of time since recovery of the buffer was undertaken.

36. A method, according to claim 35, further comprising:
in response to receiving an error message indicating an error with respect to a particular one of the macroblocks encoded relative to the selected one of the reference buffers, setting values for the selected reference buffer indicating that an error has occurred and that an error requires recovery to TRUE and setting the timer indicating an amount of time since recovery of the reference buffer was undertaken to zero.

37. A method, according to claim 36, further comprising:
after using the table and a second one of the reference buffers for error recovery, setting the value indicating that an error requires recovery to FALSE.

38. A method, according to claim 37, further comprising:
after setting the value indicating that an error requires recovery to FALSE, incrementing the timer.

39. A method, according to claim 38, further comprising:
in response to the timer being greater than a predetermined value, setting the value indicating that an error has occurred to FALSE.

\* \* \* \* \*